Oct. 28, 1924.

R. B. SHANCK 1,512,953

ARRANGEMENT FOR PROTECTING ELECTRICAL CONTACTS

Filed July 1, 1921

INVENTOR
*R. B. Shanck*
BY
ATTORNEY

Patented Oct. 28, 1924.

1,512,953

UNITED STATES PATENT OFFICE.

ROY B. SHANCK, OF WOODSIDE, NEW YORK, ASSIGNOR TO AMERICAN TELEPHONE AND TELEGRAPH COMPANY, A CORPORATION OF NEW YORK.

ARRANGEMENT FOR PROTECTING ELECTRICAL CONTACTS.

Application filed July 1, 1921. Serial No. 481,985.

*To all whom it may concern:*

Be it known that I, ROY B. SHANCK, residing at Woodside, in the county of Queens and State of New York, have invented certain Improvements in Arrangements for Protecting Electrical Contacts, of which the following is a specification.

This invention relates to arrangements for protecting electrical contacts from sparking and the attendant pitting and building up which would result therefrom at such points in an electrical circuit. The arrangements of the invention would be particularly desirable in cases where a relay or switch with small electrical or mechanical input energy is required to control comparatively high voltage and power by means of its contacts.

Different protective devices are desirable at "make" from those desirable at "break" and accordingly it is a feature of the arrangements of the invention to provide a local or auxiliary relay to set up before each operation the desired protective circuit arrangement for each operation of the main relay or switch.

The desirability of different protective arrangements at "make" and "break" will be clear from the following. It is well known that the sparking, which occurs on breaking an electrical circuit in which current is flowing, may be considerably reduced by having a condenser bridged across the contacts. The condenser prevents the voltage across the gap from rising so abruptly by the tendency to prolong the current for an instant after the break. If, however, the condenser is left bridged across the contacts at the time of closing a circuit in which voltage exists, it will introduce sparking at closing. This is due to the discharge of the condenser, which becomes charged to the potential difference existing between the contacts. A series resistance is usually employed to limit this effect but this reduces somewhat the efficiency of the protecting circuit at "break". Also a high resistance alone bridged across the contacts may reduce sparking at closing by draining off the charge from capacity in the circuit.

The arrangements of the invention are particularly useful in the case of direct-current telegraph circuits and apparatus, especially for the line relays of such systems. Accordingly the arrangements have been illustrated as associated with the contacts of a line relay of a telegraph circuit. It is pointed out however that these arrangements are not limited to such specific use but are adapted for many other uses including the protecting of electrically or mechanically operated signaling and power switches.

Figure 1:
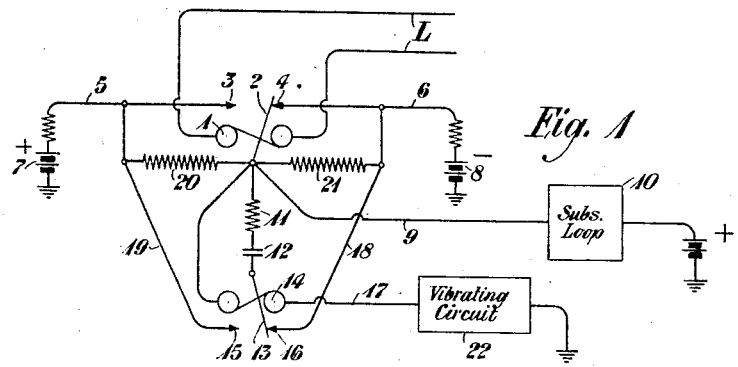
Figure 2:
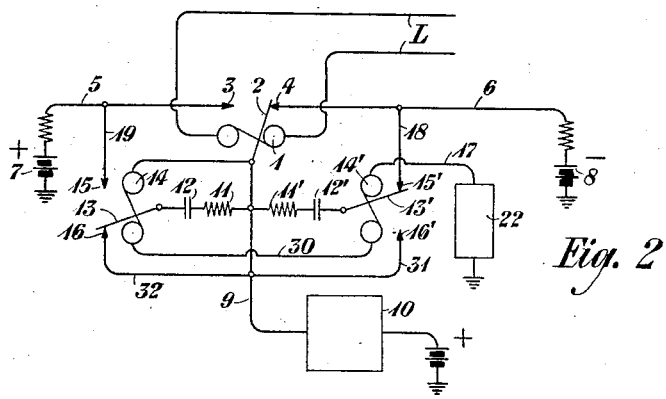
Figure 3:
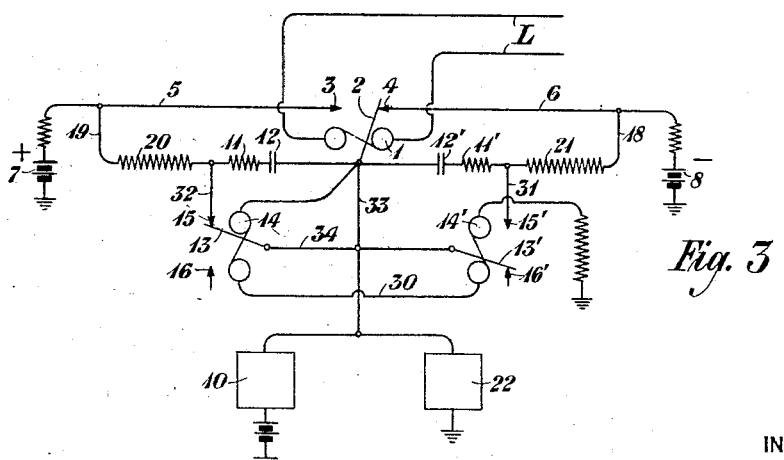

The invention may be more fully understood from the following description when read in connection with the accompanying drawing in the Figure 1 of which is illustrated a preferred embodiment thereof and in the Figs. 2 and 3 are shown modifications of the arrangements. Similar reference characters have been used to denote like parts in all of the figures.

In Fig. 1 is shown a telegraph line L connected to a relay, such as the telegraph relay 1. The arrangements of this invention are designed for the protection of the contacts 3 and 4 and armature 2 of this relay. Connected by the conductors 5 and 6 to these contacts are the oppositely poled batteries 7 and 8. Connected to the armature 2 of relay 1 by the conductor 9 is the subscriber's apparatus 10 which is well known in the art and hence illustrated only in schematic form. Connected in series to the armature 2 are the resistance 11 and the condenser 12. These devices may form part of a bridged protective circuit between the contact 4 and armature 2 over the armature 13 and contact 16 of an auxiliary relay 14 and conductor 18, or part of a protective circuit between contact 3 and armature 2 over the armature 13 and contact 15 of relay 14 and conductor 19 as will be pointed out more fully. Connected between the armature 2 and conductors 18 and 19 are the high resistance elements 21 and 20 respectively. The operating circuit for the auxiliary relay 14 is completed from battery connected to one of the contacts and armature of relay 1 and over the conductor 17 to the vibrating circuit 22 and ground.

The protective arrangements of Fig. 1 operate in the following manner: The line relay 1 and the auxiliary relay 14 are shown with their armatures closed against contacts 4 and 16 respectively. In this position the condenser 12 and resistance 11 will be included in the following bridge circuit between armature 2 and contact 4; from armature 2, resistance 11, condenser 12, armature 13, contact 16, conductor 18, conductor 6, to the contact 4. Accordingly when the line relay 1 is actuated and the armature 2 "breaks" with contact 4 the condenser 12 will be bridged across the resulting gap and tend to prevent and reduce sparking at the contact 4. After the armature 2 "breaks" with contact 4 the operating circuit for the auxiliary relay 14 will be broken and it will cause its armature 13 to break contact with contact 16. After armature 2 "makes" with contact 3 armature 13 will then "make" with contact 15. It is preferable that the operation of relay 1 should be slightly in advance of relay 14. Accordingly after the armature 2 of relay 1 has made contact with contact 3 and is ready for its next "break" therefrom the following protective circuit will be bridged between armature 2 and contact 3,—from contact 3, conductor 19, contact 15, armature 13, condenser 12, resistance 11, and armature 2. Accordingly when the "break" next occurs between contact 3 and armature 2 the condenser 12 will be in bridge across this gap and prevent sparking thereat. In other words the auxiliary relay will operate upon each operation of the line relay to set up the proper protective circuit arrangement for the next "break" operation of the line relay. When the auxiliary relay 14 makes contact, the dissipation of the energy stored in the condenser 12 will cause some sparking on the contacts of relay 14. To make this relatively unimportant provision should be made so that relay 14 should have relatively large contact travel and large input energy. The high resistances 20 and 21 are provided so that if the auxiliary relay 14 delays breaking contact until after the line relay 1 completes its travel, the condenser 12 will have been partly charged through one of the resistances 20 and 21 while the line relay 1 was between contacts, thus preventing an excessively heavy charging current from positive to negative battery through the line relay contacts.

In the modification of the invention shown in Fig. 2 two auxiliary relays 14 and 14' connected in series, or one relay with two armatures, are used. Two resistances 11 and 11' and two condensers 12 and 12' are also provided. In the arrangement as shown a protective circuit is set up so that when the armature 2 "breaks" with contact 4 the condenser 12' and resistance 11' will be bridged across the gap to prevent sparking, in the following manner,—from armature 2, resistance 11', condenser 12', armature 13' of relay 14', contact 15', and conductor 6, to contact 4. After this "break" the following operating circuit for relays 14 and 14' will be opened,—from ground and battery 8, conductor 6, contact 4, armature 2, winding of relay 14, conductor 30, winding of relay 14', conductor 17, through the vibrating apparatus 22, to ground. The opening of this circuit will cause the armatures of the auxiliary relays to move to their opposite contacts. The closing of armature 13' against contact 16' will serve to short-circuit and discharge condenser 12' over conductor 31. The operation of relay 14 will serve to close across contact 3 and armature 2 the following bridged protective circuit so that when said armatures next "breaks" from said contact sparking will be prevented;—from armature 2, resistance 11, condenser 12, armature 13, contact 15, conductors 19 and 5 to contact 3. Accordingly when the "break" occurs between contact 3 and armature 2 the condenser 12 will be bridged across the gap and will prevent sparking thereat. After this "break" the operating circuit for relays 14 and 14' will be again broken. Relay 14' will in the manner already pointed out prepare a protective circuit for the next "break" at contact 4 while relay 14 will serve to short-circuit and discharge the condenser 12 over conductor 32.

In the arrangements shown in Fig. 3 the auxiliary relays 14 and 14' merely serve to short-circuit the condensers on the breaking side after the "break." In this arrangement the auxiliary relays 14 and 14' should be adjusted so as not to commence operation until after the line relay 1 has completed its travel. It will be seen from the arrangement as shown that at the "break" between armature 2 and contact 4 the gap is bridged by the condenser 12' and the resistances 11' and 21 in series over the following circuit;— from armature 2, condenser 12', resistance 11'; resistance 21, conductors 18 and 6 to contact 4. At the "make" between armature 2 and contact 3 the gap will merely be bridged by resistance 20 over the following path; from armature 2, conductors 33 and 34, armature 13, contact 15, conductor 32, resistance 20, conductors 19 and 5, to contact 3. After the relay 1 operates it opens the operating circuit of relays 14 and 14' and after a suitable interval the relays 14 and 14' will operate. The relay 14 will allow the condenser 12 to be connected in circuit for the next "break" to occur at contact 3 and the relay 14' will serve to short-circuit and discharge the condenser 12'.

While the arrangements of the invention have been illustrated as a means for affording protection to electrical contacts in a telegraph circuit, it is understood that their application is not so limited and that they may be applied to many other types of electrical contacts and switches and in many other circuits. Accordingly while the arrangements have been disclosed in certain specific arrangements which are deemed desirable it is understood that they are capable of embodiment in many other and widely varied forms without departing from the spirit of the invention as defined in the appended claims.

What I claimed is:

1. An electrical circuit comprising a pair of contacts and an armature to "make" and "break" with said contacts, a protective circuit associated with said armature and said contacts, and relay means controlled by said armature whereby said protective circuit may be bridged between said armature and either of said contracts before "break".

2. A pair of electrical contacts and a switching device adapted to "make" and "break" with said contacts, protective arrangements for preventing sparking at said contacts at "make" and at "break", and relay means controlled by said switching device for selectively associating said protective arrangements with said contacts for the "break" and the "make" operation of said switching device.

3. A pair of electrical contacts and a switching device having an armature adapted to "make" and "break" with said contacts, means controlled by said switching device for bridging an electrostatic connection between said armature and either of said contacts before "break" and means controlled by said switching device for bridging a high resistance connection between said armture and either of said contacts before "make".

4. An arrangement for preventing sparking at electrical contacts comprising electrical contacts, a switching device having an armature adapted to "make" and "break" with said contacts, a plurality of different types of protective circuits associated with said armature and said contacts, and means controlled by said switching device whereby one type of said protective circuits may be operatively connected between said armature and one of said contacts before "break" and whereby another type of said protective circuits may be operatively connected between said armature and one of said contacts before "make".

5. Protective arrangements for electrical contacts comprising a switching device having an armature adapted to "make" and "break" with said contacts, a plurality of different types of protective circuits associated with said armature and said contacts, one type of said protective circuit comprising a high resistance connection and another type comprising an electrostatic connection, and relay means controlled by said switching device whereby said first mentioned type of protective circuit may be operatively connected between said armature and one of said contacts before "make" and whereby the second mentioned type of protective circuit may be operatively connected between said armature and one of said contacts before "break".

6. A plurality of electrical contacts and a switching device having an armature adapted to "make" and "break" with said contacts, a high resistance connected between said armature and each of said contacts, a condenser connected to said armature, and means controlled by said switching device for bridging said condenser between said armature and one of said contacts before "break", said means operating to short circuit the high resistance connected to said contact.

In testimony whereof, I have signed my name to this specification this 29th day of June, 1921.

ROY B. SHANCK.